United States Patent
Maniloff et al.

(10) Patent No.: US 6,761,999 B2
(45) Date of Patent: Jul. 13, 2004

(54) NONDEGENERATE FOUR-WAVE MIXING USING PHOTOINDUCED CHARGE-TRANSFER MATERIALS

(75) Inventors: Eric S. Maniloff, Eugene, OR (US); Duncan W. McBranch, Santa Fe, NM (US); Alan J. Heeger, Santa Barbara, CA (US); Dan V. Vacar, Goleta, CA (US)

(73) Assignee: The Regents of the University of California, Los Alamos, NM (US)

(*) Notice: Subject to any disclaimer, the term of this patent is extended or adjusted under 35 U.S.C. 154(b) by 239 days.

(21) Appl. No.: 09/973,170

(22) Filed: Oct. 4, 2001

(65) Prior Publication Data

US 2002/0114998 A1 Aug. 22, 2002

(Under 37 CFR 1.47)

Related U.S. Application Data

(63) Continuation-in-part of application No. 08/889,787, filed on Jul. 8, 1997, now abandoned.
(60) Provisional application No. 60/016,093, filed on Jul. 8, 1996.

(51) Int. Cl.[7] .............................................. G03H 1/02
(52) U.S. Cl. ..................... 430/1; 430/2; 359/3; 359/4
(58) Field of Search ........................... 430/1, 2; 359/3, 359/4

(56) References Cited

U.S. PATENT DOCUMENTS

| | | | |
|---|---|---|---|
| 5,064,264 A | * 11/1991 | Ducharme et al. | 385/130 |
| 5,150,228 A | * 9/1992 | Liu et al. | 359/7 |
| 5,361,148 A | * 11/1994 | Bjorklund et al. | 359/4 |
| 5,454,880 A | * 10/1995 | Sariciftci et al. | 136/263 |
| 5,800,950 A | * 9/1998 | Hirao et al. | 430/1 |

FOREIGN PATENT DOCUMENTS

JP 07-316548 * 12/1995

OTHER PUBLICATIONS

Maniloff et al., "Charge transfer polymers: a new class of materials for non–linear optics", SPIE vol. 2854 (Aug. 1996) pp. 208–213.*
Prasad et al., "Polymeric composite photorefractive materials for nonlinear optical applications", SPIE vol. 2143, pp. 80–86.*
Brubaker et al., Josa b, 11(6), pp. 1038–1044.*
Nolte et al. Appl. Phys. Lett., 58(19) pp 2067–2069.*
E. S. Maniloff et al., "Maximized Photorefractive Holographic Storage", J. Appl. Phys. 70, pp 4702–4707 (1991).
W. E. Moerner et al., "Polymeric Photorefractive Materials", Chem. Revs. 94, pp 127–154 (1994).
N. S. Sariciftci et al., "Photoinduced Electron Transfer from a Conducting Polymer to Buckminsterfullerene", Science 258, (1992), pp 1474–1476.
V. Pham et al., "Real–Time Dynamic Polarization Holographic Recording on Auto–Erasable Azo–Dye Doped PMMA Storage Media", Opt. Mat. 4, 467 (1995).

(List continued on next page.)

Primary Examiner—Martin Angebranndt
(74) Attorney, Agent, or Firm—Samuel M. Freund; Samuel L. Borkowsky

(57) ABSTRACT

Charge-transfer materials are demonstrated to be useful for generating femtosecond holographic gratings. Using semiconducting polymers sensitized with varying concentrations of $C_{60}$, absorption holographic gratings with diffraction efficiencies of 1.6% were recorded with individual ultrafast laser pulses; the diffraction efficiency and time decay of the gratings were measured using nondegenerate four-wave mixing. High quantum efficiency for electron transfer reduces the effects of early recombination which otherwise limits the density of excitations in pure polymers, and the metastability of the charge transfer enables tuning of the decay dynamics by controlling the concentration of acceptors in the mixture.

8 Claims, 4 Drawing Sheets

OTHER PUBLICATIONS

Y. Pang et al., "Photoinduced Processes and Resonant Third–Order Nonlinearity in Poly (3–Dodecylthiophene) Studied by Femtosecond Time Resolved Degenerate Four Wave Mixing", J. Chem. Phys. 92, 2201 (1990).

G. Yu et al., "Charge Separation and Photovoltaic Conversion in Polymer Composites with Internal Donor–Acceptor Heterojunctions", J. Appl. Phys. 78, 4510 (1995).

N. C. Greenham et al., "Charge Separation and Transport in Conjugated–Polymer/Semiconductor–Nanocrystal Composites Studied by Photoluminescence Quenching and Photoconductivity", Phys. Rev. B 54, No. 24, 17628–17637 (1996).

* cited by examiner

1

NONDEGENERATE FOUR-WAVE MIXING USING PHOTOINDUCED CHARGE-TRANSFER MATERIALS

This application also claims the benefit of prov. 60/016,093 filed on Jul. 8, 1996.

The present patent application is a continuation-in-part patent application of copending application Ser. No. 08/889,787, attorney's docket no. S-84,987, which was filed on Jul. 08, 1997 now abandoned.

FIELD OF THE INVENTION

The present invention relates generally to the application of charge-transfer materials to nonlinear optics and, more particularly, to femtosecond nondegenerate four-wave mixing in donor-acceptor material blends for generating ultrafast holographic effects. This invention was made with government support under Contract No. W-7405-ENG-36 awarded by the U.S. Department of Energy to The Regents of the University of California and under Contract No. F49620-95-0395 awarded by the Air Force Office of Scientific Research to The Regents of the University of California. The government has certain rights in the invention.

BACKGROUND OF THE INVENTION

Holographic gratings are a principal component of dynamical optical systems based on nonlinear optical materials, and are useful in a variety of optical applications, including interconnection networks, optical memories, and optical computing. Inorganic photorefractive crystals have been the most widely studied materials for such applications. For descriptions of applications of holographic non-linear optical materials, see, e.g., E. S. Maniloff and K. M. Johnson, "Maximized Photorefractive Holographic Storage", J. Appl. Phys. 70, 4702 (1991). Recently, however, organic holographic materials such as photorefractive polymers, photochromic molecules, and semiconducting polymers, have received considerable attention. See, e.g., W. E. Moerner and S. M. Silence, "Polymeric Photorefractive Materials," Chem. Revs. 94, 127 (1994), for a discussion concerning slow photorefractive polymeric materials. One of the major problems constraining the practical use of holographic materials has been the trade-off between speed and diffraction efficiency inherent in many classes of materials. The class of materials with the highest diffraction efficiencies has been photorefractives; however, the response time of these materials has been limited by diffusion (or drift) rates. Third-order ($\chi^{(3)}$) nonlinear optical materials can have essentially instantaneous response times, but have low diffraction efficiencies.

The optical properties of semiconducting polymers are significantly changed with the addition of buckminsterfullerene, $C_{60}$. After photoexcitation across the $\pi$-$\pi$* gap, an electron transfers from the polymer (as donor) to the $C_{60}$ (as acceptor). The charge-transfer process is ultrafast, occurring within 300 fs, with a quantum efficiency approaching unity. See, e.g., N. S. Sariciftci et al., Science 258, 1474 (1992) for a discussion of donor-acceptor photoinduced charge transfer. As a result of the efficient photoinduced intermolecular charge transfer, the photoinduced absorption (PIA) and photoinduced reflectance (PIR) spectral features of the composite films can be significantly enhanced in magnitude over those in either of the component materials. The corresponding changes in the complex refractive index, $\Delta N = \Delta n(\omega) + i \Delta \kappa(\omega)$, imply that charge-transfer mixtures offer promise as nonlinear optical materials, i.e., as holographic materials with absorption gratings in spectral regions where $\Delta \kappa(\omega)$ dominates and as holographic materials with index gratings in spectral regions where $\Delta n(\omega)$ dominates. Holographic recording using photoinduced charge transfer has a number of characteristics which distinguish it from other materials discussed in the literature: 1) The materials respond on a femtosecond timescale, 2) A larger diffraction efficiency is achieved than any previous report using ultrafast materials, and 3) Control of the holographic relaxation rate is achieved by use of a two-component recording mechanism.

A comparison of the maximum diffraction efficiency or the response time of different materials does not allow an adequate evaluation of their relative merits, since rapid data processing requires having both a large response and a rapid recording rate. As a figure-of-merit for comparing previous research, the temporal diffraction efficiency (TDE) is defined as $\eta/\tau$, with $\eta$ being the diffraction efficiency and $\tau$ being the time constant governing the holographic buildup. The TDE gives a measure of how fast and how strongly a material responds to the recording waves and, therefore, of how rapidly the material can be expected to be used for data processing. When using this figure of merit, it is important to note the intensity at which the measurement is made as well as the saturation diffraction efficiency, since increasing the recording intensity will affect the rate at which a grating is recorded, and a high value of the TDE does not necessarily imply that a material has sufficiently high maximum response for a particular application. As an example, photorefractive materials have large efficiencies (approaching unity), but because they respond on timescales $\geq 1$ s, they have TDE values $\leq 1$ s$^{-1}$, for intensities of approximately 1 W/cm$^2$.

A large number of materials that undergo photoisomerization have recently been reported, and suggested as possible elements for dynamic holographic processing. The TDE of these materials is in the range of $10^{-1}$–$10^{-6}$ s$^{-1}$, with recording intensities typically in the range of 10–50 mW/cm$^2$. For example, V. Pham et al., in Opt. Mat. 4, 467 (1995), report the maximum diffraction efficiency as 5%, with a recording time constant of 3.2 s for an intensity of 19 mW/cm$^2$, corresponding to a TDE of $1.6 \times 10^{-2}$. Studies of photoisomerization has shown that by using nondegenerate four-wave mixing (NDFWM) leads to a significant improvement in diffraction efficiencies.

Third-order nonlinearities have been extensively used for degenerate four-wave mixing in organics and for demonstrations of optical processing. Because of the ultrafast response of these materials, TDE values as high as $10^9$ s$^{-1}$ ($\eta \approx 10^{-4}$ in 160 fs) have been reported for pulse energies of $\approx 5$ µJ (500 µJ/cm$^2$). As a mechanism for incoherent third-order nonlinearity, $\chi_{inc}^{(3)}$, the photoinduced electron transfer of semiconducting polymer/$C_{60}$ mixtures offers two important advantages: the metastability of the charge transfer enables control of the grating decay dynamics by varying the concentration of acceptors in the mixture, and the photoinduced charge transfer enhances the magnitude of the modulated changes in the complex index of refraction at certain wavelengths.

Accordingly, it is an object of the present invention to photoinduce large changes in the complex index of refraction for mixtures of donor and acceptor charge-transfer species such that ultrafast holographic gratings are generated.

Another object of the invention is to photoinduce large changes in the complex index of refraction of mixtures in blends of semiconducting polymers with $C_{60}$ such that ultrafast holographic gratings are generated.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method for nondegenerate four-wave mixing in charge-transfer materials of this invention includes the steps of preparing a mixture of charge-donor species capable of absorbing light within a first wavelength region with charge-acceptor species, such that charge transfer occurs between the charge-donor species and the charge-acceptor species in the absence of an externally applied dc electric field when the mixture is excited by light in the first wavelength region; exciting the mixture with two light beams within the first wavelength region, the two light beams overlapping in the blend and further having an angle therebetween, whereby a holographic grating is formed in a region of the mixture surrounding the overlapping of the two light beams; passing light within a second wavelength region through the holographic grating region of the mixture, wherein the second wavelength region is chosen such that light therein is not absorbed by the mixture in the absence of charge transfer; and detecting the diffracted light within the second wavelength region.

Benefits and advantages of the invention include enhancement of the magnitude of modulated changes in the complex index of refraction at certain wavelengths, and control of the decay dynamics through variation of the concentration of acceptors in the mixture.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION

Figure 1:
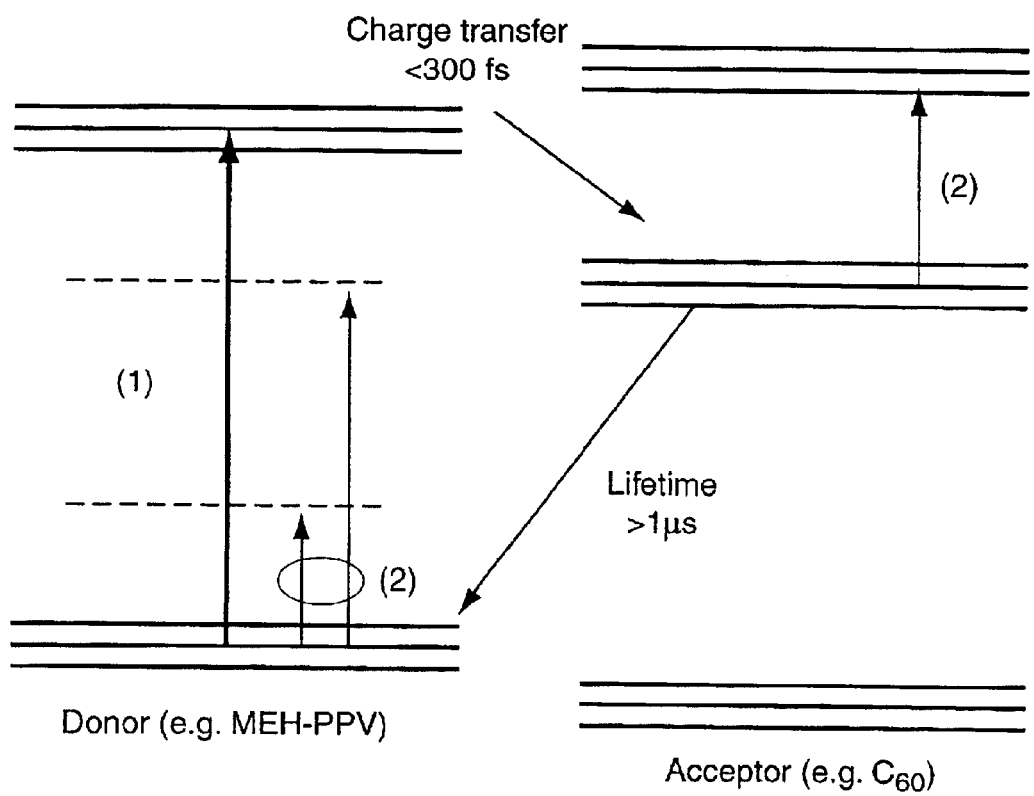
FIG. 1 is a schematic representation of energy levels for photoinduced charge transfer in a donor-acceptor system.

Briefly, the present invention includes a class of holographic nonlinear optical materials with large diffraction efficiencies and ultrafast response times. Charge-transfer materials, which include conducting polymer blends, CdSe/CdS semiconductor nanocrystals, and porphyrin, Phthalocyanine and $C_{60}$ derivatives, as examples, are a class of nonlinear optical materials which permit single-shot recording of holographic gratings using ultrafast pulsed lasers. Transient gratings with relatively large diffraction efficiencies are created and probed using nondegenerate four-wave mixing (NDFWM); a resonant optical pump beam creates the grating in the absence of an externally applied dc electric field, and a nonresonant optical probe beam is diffracted by the grating. That is, holographic recording in charge-transfer materials is achieved by use of a pump beam that is strongly absorbed in the host material, in order to obtain a large population of photoexcitations, and a probe wavelength near the peak of the excited state absorption, such that the probe wavelength is fully transmitted in the absence of the generated grating, but is strongly diffracted by the generated grating, since new absorption bands are formed after photoexcitation. Results of ultrafast holographic recording using $C_{60}$/conducting polymer mixtures, are presented as an example of this general process. These materials combine the best features of both traditional slow holographic and fast nonlinear optical materials. Additionally, such charge-transfer polymers are demonstrated to exhibit performance 2 to 12 orders of magnitude better than any previously reported material.

Spatially modulated $\Delta\kappa(\omega)$ and $\Delta n(\omega)$ at the probe wavelength (1.55 eV) are observed. Alternatively, by using a probe beam farther into the infrared (near 1.2 eV), it is expected that diffraction would occur solely via spatially modulated $\Delta n(\omega)$. As a mechanism for incoherent third-order nonlinearity, $\chi^{(3)}$, the photoinduced electron transfer of semiconducting polymer/$C_{60}$ mixtures offers two important advantages: the photoinduced charge transfer enhances the magnitude of the modulated changes in the complex index of refraction, $\Delta N$, at certain wavelengths, and the metastability of the charge transfer enables control of the decay dynamics by varying the concentration of acceptors in the mixture. See, e.g., Y. Pang and P. N. Prasad, J. Chem. Phys. 92, 2201 (1990) for a discussion of the use of pure conjugated polymers for degenerate four-wave mixing. By contrast, the present invention utilizes nondegenerate four-wave mixing. Because the pump beam is strongly absorbed in the host polymer, a large population of photoexcitations can be achieved. Consequently, while the probe beam is fully transmitted in the absence of the holographic grating, the induced absorption at the probe wavelength is sufficient to cause a relatively large modulation of the absorption cross-section. Moreover, the use of a nonresonant probe yields an absorption modulation which is background-free.

In "Charge Separation and Photovoltaic Conversion in Polymer Composites with Internal Donor-Acceptor Heterojunctions," by G. Yu et al., J. Appl. Phys. 78, 4510 (1995), certain derivatives of poly(phenylene-vinylene) (PPV) are demonstrated to be electron acceptors (cyano-PPV) when combined with other PPV-derivatives (MEH-PPV) which act as donors in photovoltaic charge-transfer experiments. Therefore, is it expected by the present inventors that mixtures of such polymers would behave in a similar manner to mixtures of semiconducting polymers with $C_{60}$.

It is demonstrated that semiconductor nanocrystals, such as CdSe, can also act as electron acceptors when combined with PPV in "Charge Separation and Transport in Conjugated-Polymer/Semiconductor-Nanocrystal Composites Studied by Photoluminescence Quenching and Photoconductivity," by N. C. Greenham et al., Phys. Rev. B 54, no. 24, 17628–17637 (1996). Therefore, it is expected by the present inventors that mixtures of semiconducting polymers and semiconducting nanocrystals would behave in a similar manner to mixtures of semiconducting polymers with $C_{60}$. Since the existence of photoinduced charge transfer depends primarily on the relative energy level spacing in donor/acceptor species, it is also expected that a wide range of organic and inorganic materials will behave in a similar manner, provided they are chosen with the appropriate energy level spacing. Examples include organic molecules such as porphyrins and phthalocyanines.

Reference will now be made in detail to the present preferred embodiments of the invention, examples of which are illustrated in the accompanying drawings.

FIG. 1 hereof shows a schematic representation of the energy level diagram for a typical charge-transfer nondegenerate four-wave mixing process. Pump beam, 12, is resonant with transitions in a donor species. Probe beam, 24, is resonant with new transitions (having lifetimes greater than 1 ns ($1\times10^{-9}$ s)) in the charge-transfer state of the donor which results from charge transfer to the acceptor species. In the present example, the lifetime is >1 $\mu$s (>$1\times10^{-6}$ s). In the particular transfer arrangement illustrated, the probe beam is also resonant with transitions in the acceptor species which results in further enhancement of the PIA and PIR spectral features of the composite material. It is preferred that the charge transfer be achieved in less than 1 ps (<$1\times10^{-12}$ s). In the present example, this charge-transfer time is <$3\times10^{-13}$ s.

Figure 2:
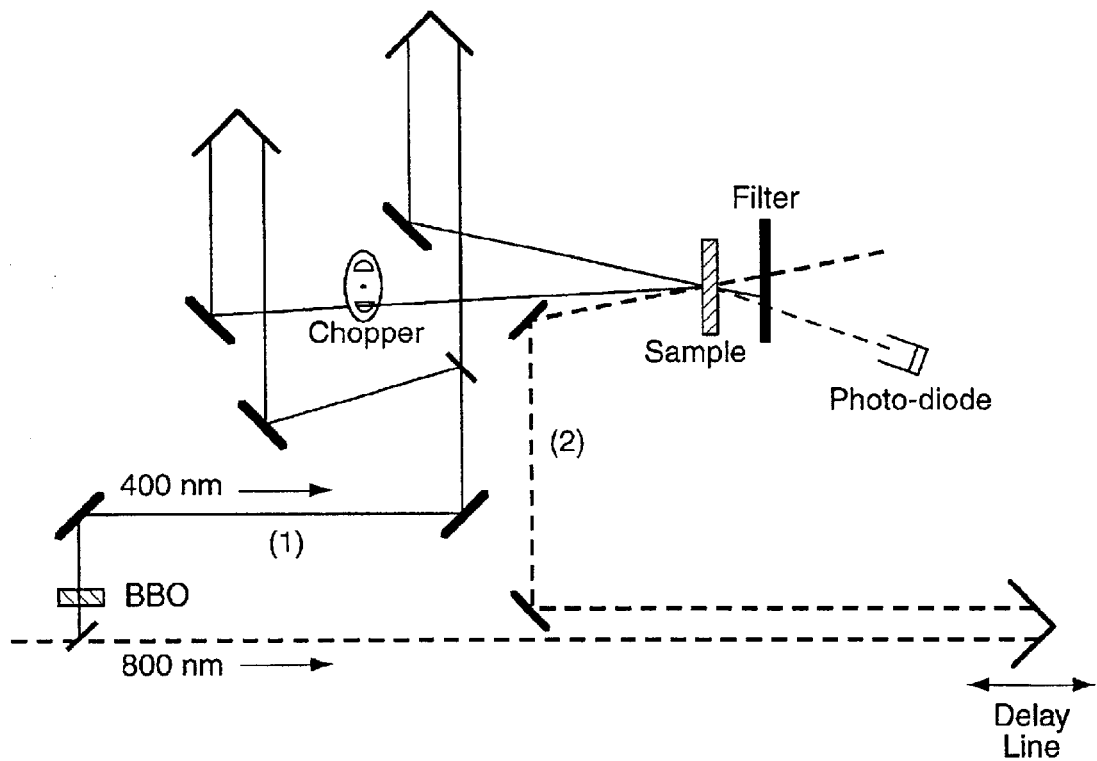
FIG. 2 is a schematic representation of the apparatus of the present invention used to demonstrate the formation of a holographic grating for the donor-acceptor system schematically described in FIG. 1 hereof.

A schematic representation of the NDFWM apparatus is shown in FIG. 2. The second harmonic from a regeneratively amplified Ti:sapphire laser, 10, (pulsewidth ≈150 fs at the sample plane) operating at 800 nm was frequency doubled, 12, using BBO crystal, 14, and divided into two beams, 16, and 18, using beamsplitter, 20, for generating the holographic grating in sample, 22 in the absence of an externally applied dc electric field. The sample was kept under vacuum to inhibit photobleaching processes, and was illuminated over an area of approximately 1 mm². The crossing angle of the pump beams was approximately 10°. Resulting gratings were detected using probe beam, 24, at the laser output wavelength (800 nm), separated before doubling crystal 14 using beamsplitter, 26, and incident on the sample at an angle of about 7°measured from the normal to the sample. All three incident beams were vertically polarized. Diffracted signal intensities were detected by chopping one of the pump waves at 140 Hz using chopper, 28, and measuring the diffracted beam, 30, by means of photodiode, 32, and synchronous (lockin) detector, 34. Probe beam 24 was time-delayed with respect to the pump by passing the probe beam through a computer-controlled, 36, delay line, 38, before reaching the sample. This apparatus can also be used to measure induced absorption at 800 nm by pumping with a single chopped 400 nm beam and synchronously detecting the modulation in the transmitted probe intensity.

Figure 3:
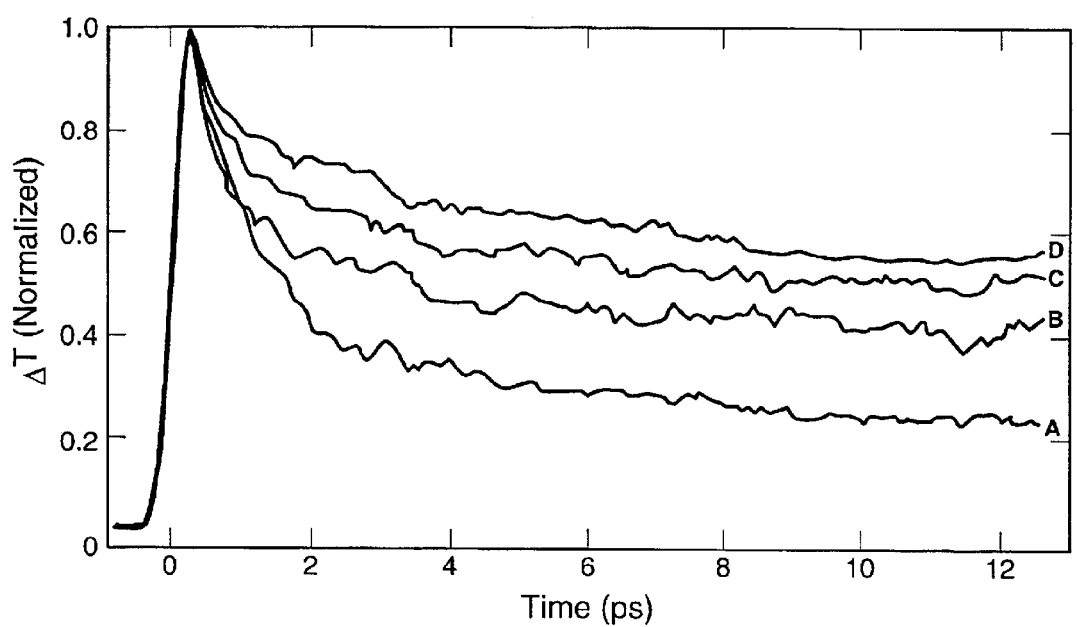
FIG. 3 shows the observed time response for transient absorption for several concentrations of $C_{60}$ (acceptor)-doped poly[2-methoxy,5-(2'-ethylhexoxy)-1,4-phenylene vinylene], MEH-PPV (donor).

FIG. 3 shows normalized PIA data for poly [2-methoxy, 5-(2'-ethylhexoxy)-1,4-phenylene vinylene], MEH-PPV, sensitized with varying quantities of $C_{60}$. The samples were prepared from concentrated solutions, codissolved with varying concentrations of $C_{60}$ (pure MEH-PPV, A; MEH-PPV with 5% $C_{60}$, B; MEH-PPV with 10% $C_{60}$, C; and MEH-PPV with 25% $C_{60}$, D). Thin film samples with excellent uniformity were spincast from solution. The data shown in FIG. 3 were taken with pump pulse energies of approximately 3 $\mu$J illuminating an area of 1 mm² at the sample plane. The results demonstrate that by varying the concentration or number of electron acceptors, it is possible to control the relaxation dynamics following photoexcitation.

Figure 4:
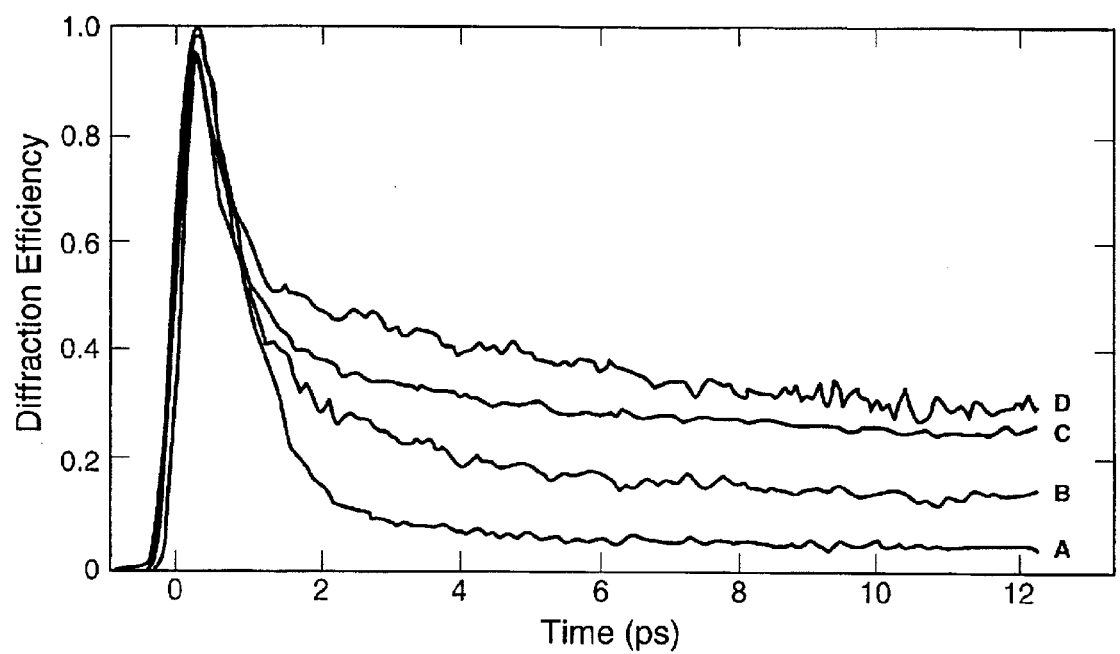
FIG. 4 shows the observed time response for the generated holographic grating for several concentrations of $C_{60}$-doped MEH-PPV.

FIG. 4 shows the temporal dynamics of holographic gratings recorded in the same samples used for generating the PIA data in FIG. 3, where the curves are labeled identically to those in FIG. 3. The maximum diffraction efficiency observed in these experiments was 1.6%. The holographic signals result from modulation of the complex refractive index, $\Delta N$, at the probe wavelength. Since the holographic diffraction efficiency is proportional to the square of the modulation in $\Delta N$ (for small modulations), the decay of the square of the PIA signal follows the decay of the diffracted beam. Holographic gratings have also been recorded in poly(3-hexyl thiophene) and a five-ring oligomer of MEH-PPV mixed with $C_{60}$ at various concentrations, with similar results.

To provide insight into the increased diffraction efficiency using nondegenerate four-wave mixing (NDFWM) as opposed to degenerate four-wave mixing, a simple analysis for thin holographic gratings is employed, in which index gratings arising from the induced absorption ($\Delta\kappa$) only are considered. The ground state population density in the presence of the resonant recording (pump) beam may be expressed as $$N(x)=N_o-(\tfrac{1}{2})N_oD[1+\cos(K\cdot x)] \qquad (1)$$

for the case of a grating with modulation in the x direction, where D is the fraction of the ground state population which has been depleted (D=1 corresponds to a complete population inversion). In the case of a resonant (degenerate) probe beam, the amplitude, $E_t$, is given by:

$$E_t=E_o\exp[(-\sigma_g N(x)z)], \qquad (2)$$

where $\sigma_g$ is the ground-state absorption cross section for the degenerate probe beam. Combining these equations and solving for the diffracted wave, $E_d$, results in $$E_d = E_o \frac{\sigma_g N_o D z}{4}\exp\left[-\sigma_g N_o\left(1-\frac{D}{2}\right)z\right] \qquad (3)$$

for small values of $\sigma_g N_o D$. This expression contains the magnitude of the modulation of the resonant absorption ($\sigma_g N_o D$) multiplied by an exponential damping term with the average (large) resonant absorption in the exponent. Maximizing this expression for the diffracted wave results in a value of $\sigma_g N_o D=1/(1-D/2)$. A similar analysis results in the following expression for a nondegenerate probe beam:

$$E_d = E_o \frac{\sigma_e N_o D z}{4}\exp\left[-\frac{\sigma_e N_o D}{2}z\right] \qquad (4)$$

where $\sigma_e$ represents the absorption cross section of the excited state at the probe wavelength. The exponential damping term in this expression is smaller than that in Eq. (4) for D<1. Maximizing this expression yields $\sigma_e N_o z=2/D$. As an example, assuming D=0.2, the diffraction efficiency ($\eta$) for the degenerate case is maximized for $\sigma_g N_o z=1.11$ for which $\eta=0.042\%$. For the same conditions in the nondegenerate case, assuming $\sigma_e=\sigma_g$, $\eta=0.25\%$. These numbers represent diffraction efficiencies for a sample that has been maximized for the degenerate (resonant) probe. However, the diffraction efficiency in the nondegenerate case can be further increased by using a more absorptive (thicker) sample, up to a theoretical maximum of 3.4%. In the nondegenerate case, higher diffraction efficiencies can be achieved by choosing materials in which the absorption cross section of the excited state exceeds that for the ground state (a requirement for optical limiting materials as well). A similar analysis leads to enhanced diffraction efficiency using NDFWM for photoinduced index gratings as well.

Equation 4 indicates that the diffracted wave is proportional to $E_o$ and to $N_oD$. Since $N_oD$ is proportional to the intensity of the pump beam ($I_p \alpha E_p^2$), the diffracted wave can be written as $$E_d = \chi^{(3)}|_{inc} E_o E_p^2 \qquad (5)$$

where hu $\chi^{(3)}|_{inc}$ is the equivalent incoherent third order susceptibility. Note that since $N_oD$ also depends on the pulsewidth (for pulsewidths less than the decay time), $\chi^{(3)}|_{inc}$ depends on the fluence, rather than on the flux. To obtain a 1.6% diffraction efficiency from a nonresonant, coherent third order nonlinearity with the same pump power would require $\chi^{(3)} > 10^{-8}$ esu. Thus, $\chi^{(3)}|_{inc}$ obtained from the charge transfer blends is at least two orders of magnitude larger than nonresonant coherent $\chi^{(3)}$ values typical of conjugated polymers. Because this is an incoherent process, equivalent diffraction efficiencies can be obtained using longer pulses, provided that the pulsewidth is shorter than the recombination time (which can be controlled via the concentration of acceptors, and can be as long as milliseconds). Further optimization of the diffraction efficiency will be obtained at wavelengths where the sum of index gratings and absorption gratings are maximized.

The foregoing description of the invention has been presented for purposes of illustration and description and is not intended to be exhaustive or to limit the invention to the precise form disclosed, and obviously many modifications and variations are possible in light of the above teaching. For example, the analysis set forth hereinabove demonstrates that the use of nondegenerate four-wave mixing allows holography with enhanced diffraction efficiency, and with control of effective time constant, by a choice of appropriate charge-transfer materials. Clearly, other donor-acceptor systems may be employed for nondegenerate four-wave mixing. See, e.g., *"Photoinduced Electron Transfer Reactions in Mixed Films of p-Conjugated Polymers and a Homologous Series of Tetracyano-p-quinodimethane Derivatives,"* by Rene A. J. Janssen et al., *J. Chem. Phys.* vol. 103, pp. 8840–8845 (1995). Moreover, other probe wavelengths may be employed to maximize diffraction efficiency.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for femtosecond nondegenerate four-wave mixing in charge-transfer materials to produce an ultrafast, transient holographic grating, which comprises the steps of:

(a) preparing a mixture of a charge-donor species, wherein the charge-donor species includes semiconducting polymers that absorb light in a first wavelength region with a charge-acceptor species, such that charge transfer occurs between the charge-donor species and the charge-acceptor species when the mixture is excited by the light within the first wavelength region;

(b) exciting the mixture with two femtosecond scale pulsed light beams within the first wavelength region, the two pulsed light beams overlapping in the mixture and having an angle therebetween, each of the two pulsed light beams having a pulse width less than the time required for charge to be transferred back from the charge-acceptor species to the charge-donor species, whereby an ultrafast, transient holographic grating is formed in the region of the mixture surrounding the overlapping of the two light beams;

(c) passing light within a second wavelength region through the holographic grating region of the blend, wherein the light within the second wavelength region is chosen so as not to be absorbed by the mixture in the absence of charge transfer; and (d) detecting the diffracted light within the second wavelength region.

2. The method for femtosecond nondegenerate four-wave mixing in charge-transfer materials to produce an ultrafast, transient holographic grating as described in claim 1, wherein light within the second wavelength region is absorbed by species in the mixture which undergo charge transfer.

3. The method for femtosecond nondegenerate four-wave mixing in charge-transfer materials to produce an ultrafast, transient holographic grating as described in claim 1, wherein the charge-donor species includes conducting polymers which undergo photoinduced charge transfer to an acceptor species.

4. The method for femtosecond nondegenerate four-wave mixing in charge-transfer materials to produce an ultrafast, transient holographic grating as described in claim 1, wherein the charge-acceptor species includes conducting polymers which undergo photoinduced charge transfer from a donor species.

5. The method for femtosecond nondegenerate four-wave mixing in charge-transfer materials to produce an ultrafast, transient holographic grating as described in claim 1, wherein the charge-donor species are selected from the group consisting of poly(phenylene-vinylenes), poly(3-alkyl thiophenes), porphyrins, phthalocyanines, polyphenylenes, and semiconductor nanocrystals.

6. The method for femtosecond nondegenerate four-wave mixing in charge-transfer materials to produce an ultrafast, transient holographic grating as described in claim 1, wherein the charge-acceptor species are selected from the group consisting of poly(phenylene-vinylenes), poly(3-alkyl thiophenes), porphyrins, phthalocyanines, fullerenes, polyphenylenes, and semiconductor nanocrystals.

7. The method for femtosecond nondegenerate four-wave mixing in charge-transfer materials to produce an ultrafast, transient holographic grating as described in claim 1, wherein the charge-donor polymeric molecules are selected from the group consisting of poly[2-methoxy,5-(2'-ethylhexoxy)-1,4-phenylene vinylene] (MEH-PPV), poly(3-hexyl thiophene) and a five-ring oligomer of MEH-PPV.

8. The method for femtosecond nondegenerate four-wave mixing in charge-transfer materials to produce an ultrafast, transient holographic grating as described in claim 1, wherein the charge-acceptor molecules are selected from the group consisting of $C_{60}$ and tetracyano-p-quinodimethane derivatives.

* * * * *